(12) United States Patent
Stouffer et al.

(10) Patent No.: US 7,210,091 B2
(45) Date of Patent: Apr. 24, 2007

(54) RECOVERING TRACK FORMAT INFORMATION MISMATCH ERRORS USING DATA RECONSTRUCTION

(75) Inventors: Colleen R. Stouffer, Austin, TX (US); Karl A. Nielsen, Tucson, AZ (US); Kenneth W. Todd, Tucson, AZ (US); David F. Mannenbach, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 10/719,213

(22) Filed: Nov. 20, 2003

(65) Prior Publication Data

US 2005/0138526 A1 Jun. 23, 2005

(51) Int. Cl.
*G11B 20/18* (2006.01)
*G11B 20/12* (2006.01)
(52) U.S. Cl. .................................................... 714/770
(58) Field of Classification Search ................ 714/770
See application file for complete search history.

(56) References Cited

U.S. PATENT DOCUMENTS 6,466,385 B1 * 10/2002 Umeda et al. ................ 360/16

2003/0177130 A1 * 9/2003 Todd ........................... 707/100

* cited by examiner

*Primary Examiner*—R. Stephen Dildine
(74) *Attorney, Agent, or Firm*—Dan Shifrin

(57) ABSTRACT

A method, system, and article of manufacture for recovering from a track format error detected by a host computer associated with a storage controller associated with a storage disk array. The recovery method begins with saving a copy of the track format information associated with the data track that triggered the track format error in a predetermined location. Next, the track format information associated with the data track that caused the error is invalidated and the subject data is restaged. Subsequently, the restaged data is compared to the saved copy of the track format information to determine if the track format error exists with respect to the restaged data. If the track format error is detected with respect to the restaged data, the method further consists of reconstructing the data, preferably by performing a reconstruct read recovery. The reconstructed data is then compared to the saved copy of the track format information to determine if the track format error exists with respect to the reconstructed data. The method is completed by rebuilding the track format information to match the reconstructed data, writing the reconstructed data to the storage disk array, and passing the reconstructed data to the host.

26 Claims, 4 Drawing Sheets

RECOVERING TRACK FORMAT INFORMATION MISMATCH ERRORS USING DATA RECONSTRUCTION

RELATED APPLICATIONS

This application incorporates by reference commonly-assigned and co-pending U.S. patent application Ser. No. 10/719,180, entitled HOST-INITIATED DATA RECONSTRUCTION FOR IMPROVED RAID READ OPERATIONS, filed on even date herewith.

TECHNICAL FIELD

The present invention relates generally to RAID storage systems and, in particular, to recovering from read operations detected by track format errors.

BACKGROUND ART

In a non-RAID computer system, if a disk drive fails, all or part of the stored customer data may be permanently lost (or possibly partially or fully recoverable but at some expense and effort). Employing backup and archiving devices and procedures may preserve all but the most recently saved data, but there are certain applications in which the risk of any data loss and the time required to restore data from a backup copy is unacceptable. Therefore, RAID ("redundant array of inexpensive disks") systems are frequently used to provide improved data integrity and device fault tolerance. If a drive in a RAID system fails, the entire data may be quickly and inexpensively recovered.

There are numerous methods of implementing RAID systems. Such methods are commonly known in the industry and only a few will be described, and only generally, herein. A very basic RAID system, RAID level 1, employs simple mirroring of data on two parallel drives. If one drive fails, customer data may be read from the other. In RAID level 2, bits of a data word are written to separate drives, with ECC (error correction code) being written to additional drives. When data is read, the ECC verifies that the data is correct and may correct incorrect data caused by the failure of a single drive. In RAID 3, data blocks are divided and written across two or more drives. Parity information is written to another, dedicated drive. Similar to RAID 2, data is parity checked when read and may be corrected if one drive fails.

In RAID level 5, data blocks are not split but are written block by block across two or more disks. Parity information is distributed across the same drives. Thus, again, customer data may be recovered in the event of the failure of a single drive. RAID 6 is an extension of RAID 5 and allows recovery from the simultaneous failure of multiple drives through the use of a second, independent, distributed parity scheme. Finally, RAID 10 (or 1-0) combines the mirroring of RAID 1 with data striping. Recovery from multiple simultaneous drive errors may be possible.

Under some circumstances, the destage of data to a disk drive from the cache of the storage controller fails with no indication to the storage subsystem. Such a failure can result in stale, incorrect data on a drive which cannot be detected by device adaptor redundancy checking. Such an error is often first detected by the host when the data is staged up from the drive. When the stale data involves an entire track, the error may be manifested and detected as a track format error. A track format error occurs when track format information (TFI) associated with the data, such as the number of records per track and the length of those records, does not match the information the storage controller has stored for the track.

The typical recovery method employed in the prior art for this type of error is to invalidate the TFI and restage the data. A new TFI is built to match the restaged data. This recovery solution can result in an unresolved problem since there is no way to determine if the restaged data has the correct TFI because the original TFI has been discarded. While the host may be able to detect TFI mismatch errors, there is currently no recovery procedure available. Thus, a need exists to permit recovery from a TFI mismatch error which maintains the integrity of the data more effectively than simply restaging and rebuilding the TFI to match the restaged data.

SUMMARY OF THE INVENTION

The need in the art is addressed by a method for recovering from a track format error in a data storage system having a host, a storage disk array having tracks storing data, and a storage controller. The storage controller of the system stages data from the disk array and destages data to the disk array. The storage controller further passes staged data to the host and receives data from the host. The host validates the track format information associated with a data track passed to the host and thereby detects a track format error. The method of recovering from a track format error detected by the host begins with saving a copy of the track format information associated with the data track that triggered the track format error in a predetermined location. In addition, the track format information associated with the data track that triggered the track format error is invalidated, and the data is restaged. Next, the restaged data is compared to the saved copy of the track format information to determine if the track format error exists with respect to the restaged data.

In addition to checking the restaged data for the track format error, other checks of the data may be run for errors not associated with the track format information. If the track format error is detected with respect to the restaged data, the method further consists of reconstructing the data, preferably by performing a reconstruct read recovery to create reconstructed data. The reconstructed data is then compared to the saved copy of the track format information to determine if the track format error exists with respect to the reconstructed data. If the track format error is not detected with respect to the restaged data, the restaged data can be passed to the host and an indication may be made to the host that an error which is not a track format error may have occurred.

If the track format error is detected with respect to the restaged data, the method may further consist of rebuilding the track format information to match the reconstructed data, writing the reconstructed data to the storage disk array, and passing the reconstructed data to the host. In addition, the reconstructed data may be checked for errors not associated with the track format information and other errors may be corrected in a parallel process.

If the track format error is not detected in the reconstructed data, preferably the disk having the track associated with the track format error is identified and rejected from the storage disk array.

Another embodiment of the invention is a storage controller coupled to a storage disk array and a host computer capable of performing the above described steps for recovering from a track format information mismatch error.

A further embodiment of the invention is an article of manufacture comprising a storage medium having logic embedded therein to cause the components of a data storage system to execute the steps described above and recover from a track format information mismatch error.

DETAILED DESCRIPTION OF THE PREFERRED EMBODIMENT

Figure 1:
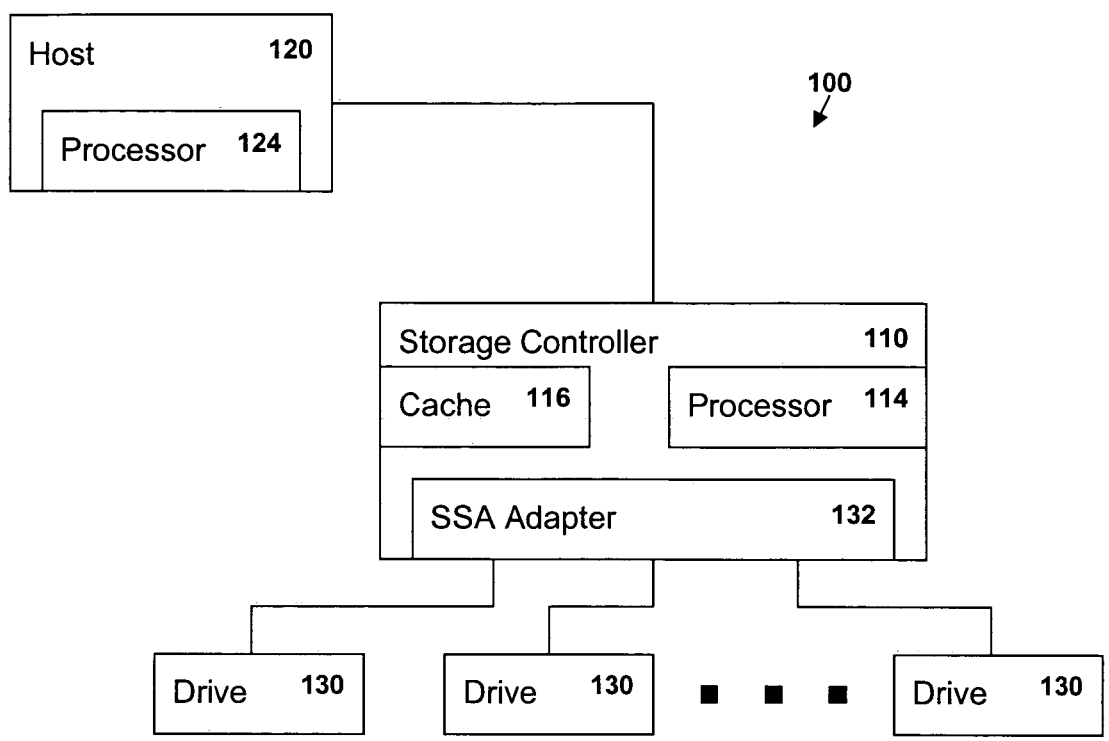
FIG. 1 is a block diagram of a generic RAID system in which the present invention may be implemented.

FIG. 1 is a block diagram of a generic storage system 100, which can be a RAID system in which the present invention may be implemented. The system 100 includes a storage controller 110 which can be a RAID controller coupled to a host or client 120. The storage controller 110 is also coupled to a disk array 130 which includes two or more disk drives. The host 120 includes a processor 124 which executes routines and issues read and write commands to the storage controller 110. The storage controller 110 also includes a processor 114 which processes commands received from the host 120 and executes storage drive routines. The storage controller 110 may also include a cache 116 for temporary storage of recently or often accessed data.

Figure 2:
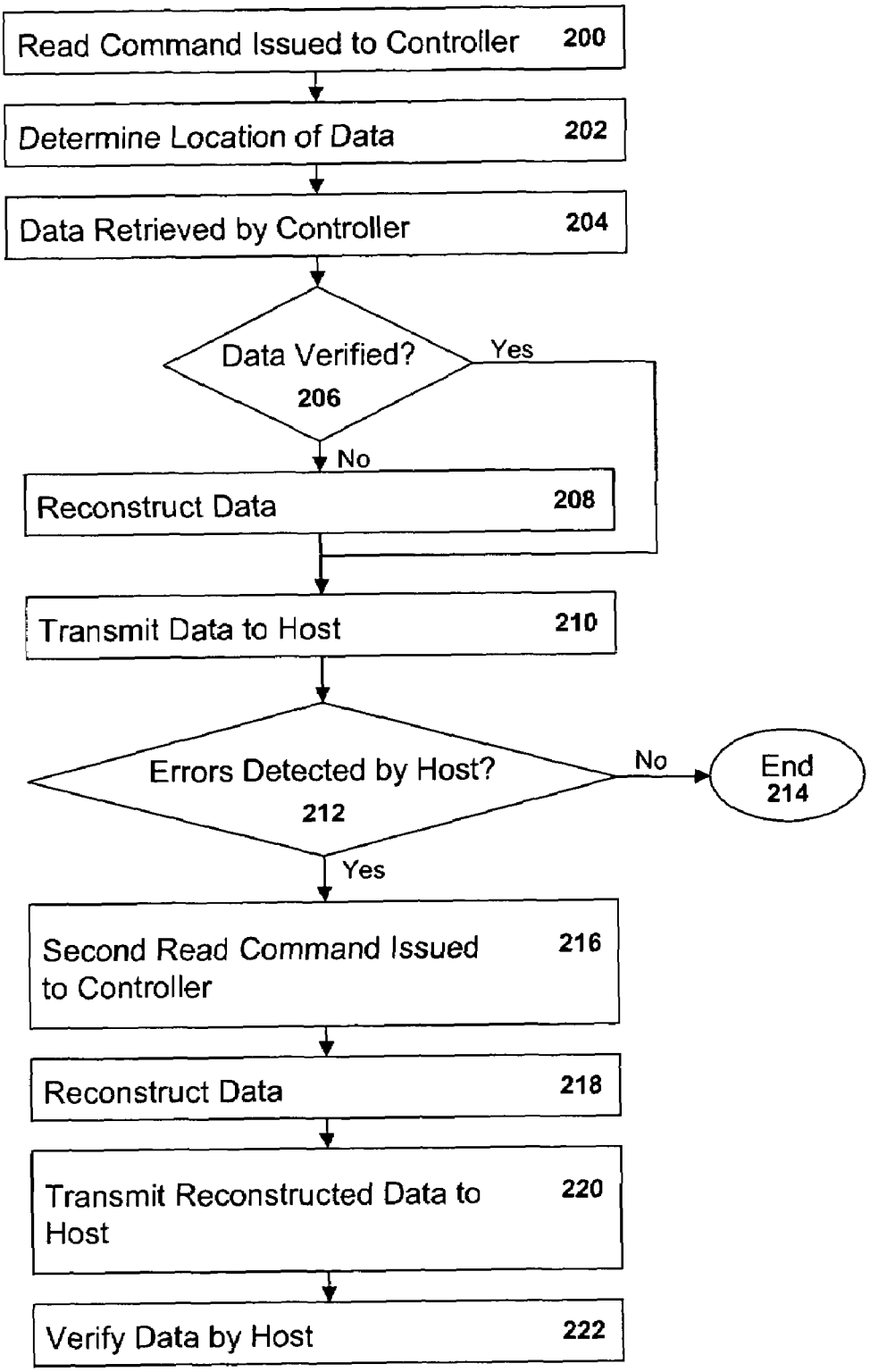
FIG. 2 is a flow chart of a host initiated data reconstruction method.

Referring also to the flow chart of FIG. 2, in a RAID system, the host 120 issues a read command to the storage controller 110 to retrieve specified customer data (step 200). The storage controller 110 determines the physical location of the data on the drives 130 or in the cache 116 (step 202). After the data is located, it is retrieved (step 204) and verified by the controller 110 (step 206). If an error is detected (such as might be caused by a medium error), the controller 110 "reconstructs" the data using the appropriate RAID algorithm (step 208). In the case of RAID level 1 or 10, the algorithm includes reading the data from another drive. In the case of other RAID levels, the algorithm includes using ECC, parity or another scheme to actually reconstruct the desired data. As used herein, the term "algorithm" will refer to any of these methods and the term "reconstruct" will refer to the process of applying of any of these methods. When the data has been verified or reconstructed, it is transmitted to the host 120 (step 210).

Figure 4:
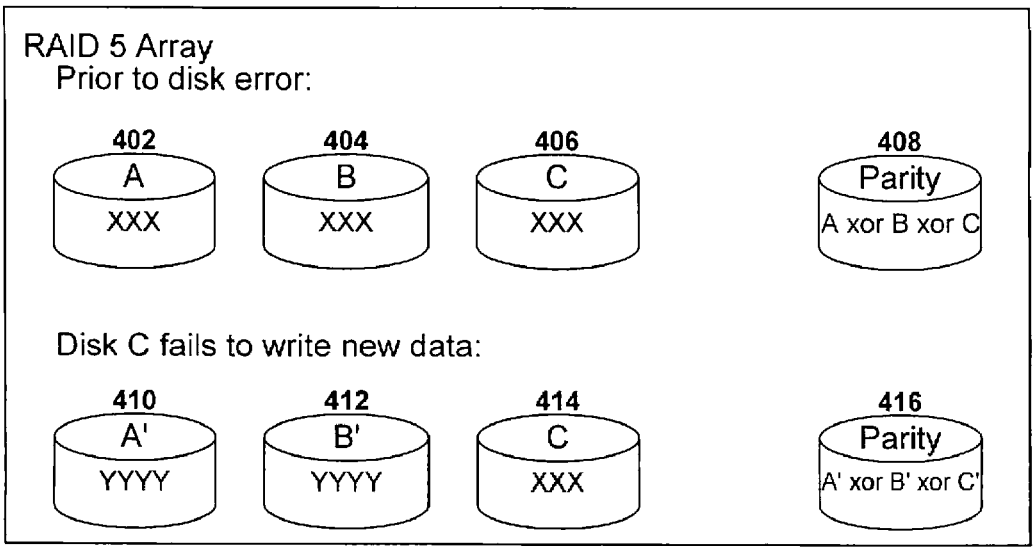
FIG. 4 is a block diagram of a RAID-5 system showing a failure which can cause a track format error.

There are certain type of errors which might escape detection by the storage controller 110. One such error can occur when the destage of data from the cache 116 to a drive 130 fails with no indication to the storage controller 110. This error will result in stale, incorrect data on the drive 130 which cannot be detected by the device adapter redundancy checking. The recovery scenario of the present invention is applicable to any suitable storage system. The recovery scenario will be discussed in the context of the RAID 5 and RAID 10 examples described above. Referring to FIG. 4, an error is shown with respect to a RAID-5 system. Prior to the failure, the tracks of disk A 402, disk B 404, and disk C 406 are consistent, which fact is reflected in the parity information 408 distributed across these drives. The error occurs when the new data fails to write to disk C 414 for example. However, the new parity information 416 is calculated using the data that should have been written to disk C 414, resulting in stale data on disk C 414 and an error which is not detected by the storage controller 110.

Figure 5:
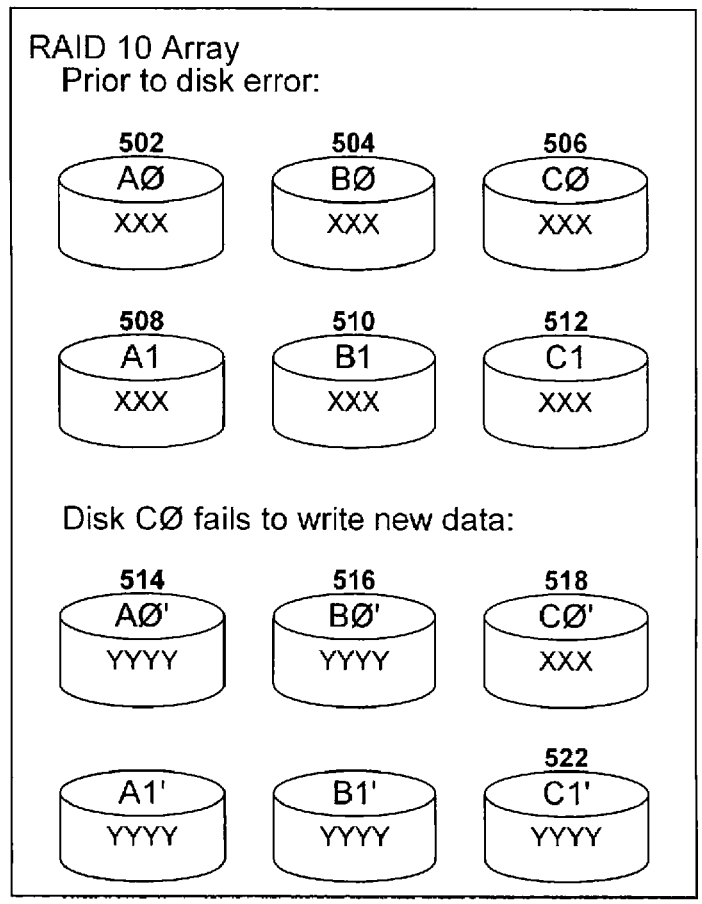
FIG. 5 is a block diagram of a RAID-10 system showing a failure which can cause a track format error.

Similarly, FIG. 5 represents this type of error occurring in a RAID-10 setting. Prior to the error, the mirrored data stored on disk A1 508, disk B1 510, and disk C1 512 is reflected on parity disk AØ 502, disk BØ 504, and disk CØ 506, respectively. After the error, which occurs when disk C0 518 fails to write the new data, the error goes undetected by the storage controller 110 because the disk drive does not give any indication that the write was not successful.

The errors described above are first detected by the host 120 when the data is staged up from the drive 130 to the cache 116 and passed to the host 120 where track format information is validated. When the stale data involves an entire track, the error may be manifested and detected by the host 120 as a track format error. Typically, the track format error is identified as a track format information (TFI) mismatch error. A TFI mismatch error occurs when the track format information which includes the number of records per track and the length of those records does not match the information that the storage controller 110 has stored for the track.

Figure 3:
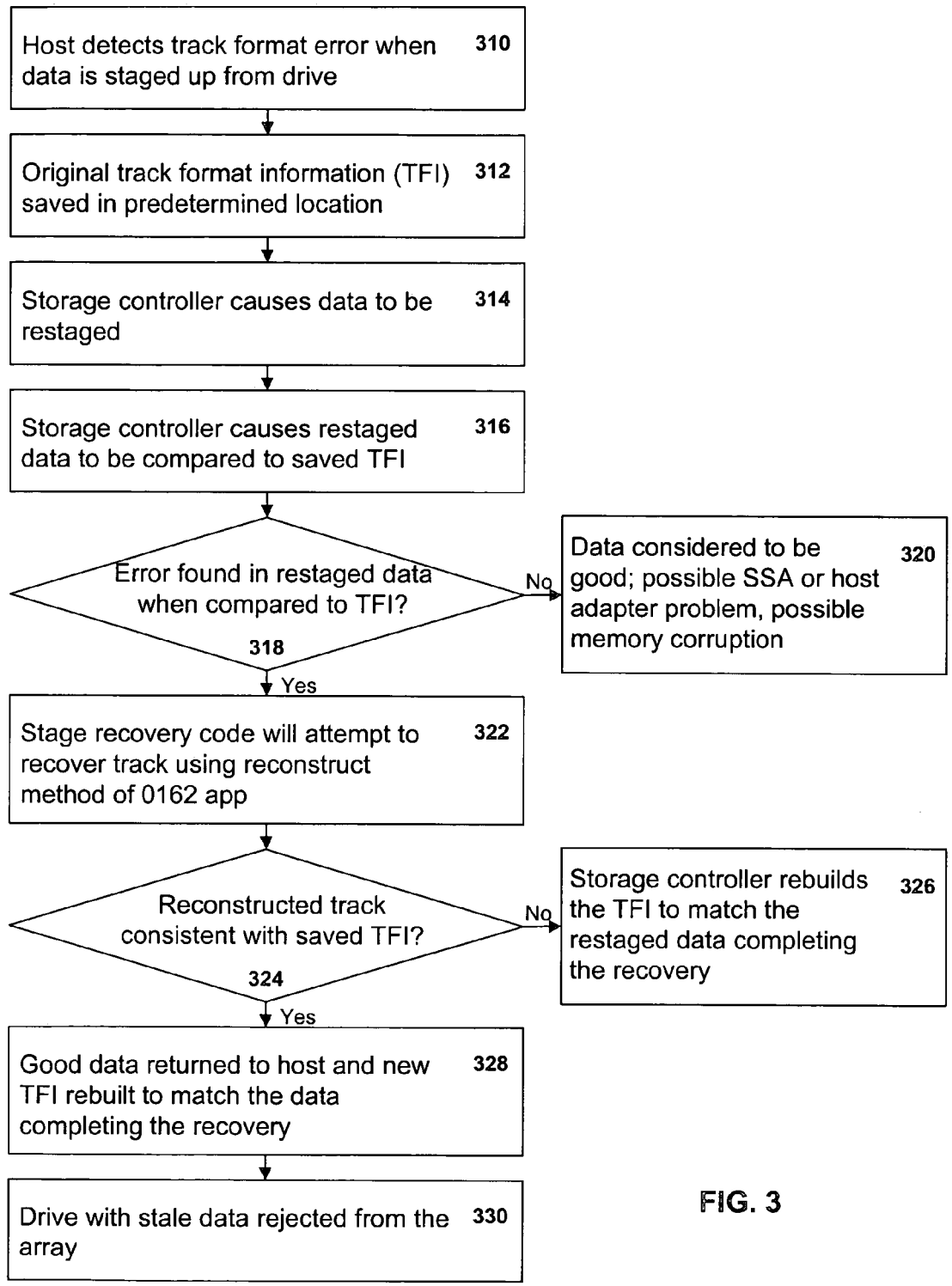
FIG. 3 is a flow chart of an implementation of the present invention.

Referring to the flow chart of FIG. 3, the recovery scenario is triggered when the host 120 detects a track format error after stale data is staged up from a disk drive 130 to the cache 116 (step 310). The track format error is initially detected when the host 120 performs a validation of the track passed to the host 120. Upon detection of the track format error, the host returns the track to the storage controller 110 for recovery. The initial step of the recovery process consists of the storage of a copy of the track format information associated with the track in a predetermined location in the cache 116 of the storage controller 110 (step 312). Subsequently, the track format information for the subject track is invalidated. In addition, the track can be checked for other errors independent of the track format information itself. Known methods of error detection such as vertical redundancy check or parity check (VRC), longitudinal redundancy check (LRC), cyclic redundancy check (CRC) or a physical address check (PA) may be employed in this step. Preferably, the storage controller 110 sets a flag indicating that subsequent recovered data is to be checked against the saved track format information as part of the recovery process. The storage controller 110 then causes the storage device, which is preferably a serial storage architecture (SSA) adapter 132, to restage the unmodified sectors of the track (step 314) and check the restaged data against the saved track format information (step 316). In addition to comparing the restaged data to the saved track format information, the data is also checked for other errors (LRC, CRC, VRC and PA, typically). If a track format error is found in the restaged data, the recovery process continues as described below (step 318). If no track format error is found in the restaged data when compared to the saved track format information, the data is assumed to be good (step 320). The initial occurrence of the track format error does indicate possible SSA or host adapter problems or, in certain instances, memory corruption (step 320). Resolution of these ancillary hardware or software errors is beyond the scope of the present invention.

Assuming that a track format error is found in the restaged data when compared to the stored track format information (step 318), flags are set indicating the errors found and triggering a data reconstruction process which preferably is the reconstruct read recovery process set forth in detail in commonly assigned and co-pending U.S. patent application Ser. Number 10/719,180, entitled HOST-INITIATED DATA RECONSTRUCTION FOR IMPROVED RAID READ OPERATIONS, which application is incorporated herein in its entirety by reference.

Reconstruction of the data may occur on a RAID-5 array, such as that depicted in FIG. 4, by issuance of a command to the SSA adapter 132 to clear the storage controller 110 cache buffers 116 and reconstruct new data for the disk causing the failure (disk C 414 of FIG. 4) using disk A' 410, disk B' 412, and the parity disk 416. If, however, the data is on a RAID-10 array, such as that depicted in FIG. 5, there is no way to tell whether the bad data was read from disk CØ' 518 or disk C1' 522. Therefore, a command is sent to the SSA adapter 132 to clear the storage controller cache buffers 116 and read the data from disk C1' 522.

Following reconstruction of the data, the reconstructed data is checked against the saved track format information (step 324). If the reconstructed data matches the saved track format information, then the drive 130 containing the track which caused the track format information error is identified as bad. A command is sent to the SSA adapter 132 to return the serial number of the bad drive 130 and an error is logged that will cause the bad drive 130 to be rejected from the RAID array (step 330). In parallel with the comparison of the reconstructed data to the saved track format information, the reconstructed data is checked for other errors by typical error detection methods such as LRC, CRC, VRC and PA. Errors which are not track format errors are returned to the storage controller 110 to be corrected.

Upon completion of the recovery process, the recovered tracks are written to the appropriate drives 130. The restage and error checking flags are turned off, and the corrected data is then staged from the disk drives 130 to the storage controller cache 116. The storage controller cache 116 rebuilds the track format information to match the recovered data (step 328). Finally, the recovered data is passed to the host 120.

In the event the reconstructed track is not consistent with the saved track format information, the recovery has failed if the data is on a RAID-5 array. If the data is on a RAID-10 array, a command is sent to the adapter 132 to clear the cache buffers and read the data from disk CØ' 518. In the event that the data read from CØ' 518 is also not consistent with the saved track format information, the recovery has failed for the data on the RAID-10 array. If the recovery fails, the storage controller must rebuild the track format information to match the restaged data completing the recovery (step 326). In the case of the RAID-10 array, the TFI is built to match the data read from CØ' 518.

The described techniques for recovery from track format information error may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., magnetic storage medium such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. Of course, those skilled in the art will recognize that many modifications may be made to this configuration without departing from the scope of the implementations and that the article of manufacture may comprise any information bearing medium known in the art.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method of recovering from a track format error in a data storage system having a host, a storage disk array having tracks storing data and a storage controller, the storage controller staging data from the disk array and de-staging data to the disk array, the storage controller further passing staged data to the host and receiving data from the host, the host validating track format information associated with a data track passed to the host and thereby detecting a track format error, the method comprising:
    saving a copy of the track format information associated with the data track that triggered the track format error;
    invalidating the track format information associated with the data track that triggered the track format error;
    restaging the data; and
    comparing the restaged data to the saved copy of the track format information to determine if the track format error exists with respect to the restaged data.

2. The method of claim 1 further comprising checking the data for errors not associated with the track format information.

3. The method of claim 1 further comprising the following steps if the track format error is detected with respect to the restaged data:
    reconstructing the data; and
    comparing the reconstructed data to the saved copy of the track format information to determine if the track format error exists with respect to the reconstructed data.

4. The method of claim 3 wherein the data is reconstructed by performing a reconstruct read recovery.

5. The method of claim 1 further comprising the following steps if the track format error is not detected with respect to the restaged data:
    passing the restaged data to the host; and
    indicating to the host that an error which is not the track format error may have occurred.

6. The method of claim 3 further comprising:
    rebuilding the track format information to match the reconstructed data;
    writing the reconstructed data to the storage disk array; and
    passing the reconstructed data to the host.

7. The method of claim 3 further comprising:
    checking the data for errors not associated with the track format information; and
    correcting the errors not associated with the track format information.

8. The method of claim 6 further comprising the following steps if the track format error is not detected in the reconstructed data:
    identifying a disk having the track associated with the track format error; and
    rejecting the disk having the track associated with the track format error from the storage disk array.

9. A system for reading stored data having the ability to recover from a track format error, comprising:

a storage controller staging and de-staging data from a storage disk array, the storage controller further passing data to a host and receiving data from the host, the host validating track format information associated with a data track passed to the host and detecting a track format error;

means for saving a copy of the track format information associated with the data track that triggered the track format error;

means for invalidating the track format information associated with the data track that triggered the track format error;

means for restaging the data; and means for comparing the restaged data to the saved copy of the track format information to determine if the track format error exists with respect to the restaged data.

10. The system of claim 9 wherein the means for restaging the data comprises a command sent from the storage controller to a storage device adapter requiring the restaging of unmodified sectors associated with the data track triggering the track format error.

11. The system of claim 9 further comprising means for checking the data for errors not associated with the track format information.

12. The system of claim 11 wherein the means for checking the data for errors not associated with the track format information is one of a vertical redundancy check, a longitudinal redundancy check, a physical address check and a cyclic redundancy check.

13. The system of claim 9 further comprising the following if the track format error is detected in the restaged data:
means for reconstructing the data; and
means for comparing the reconstructed data to the saved copy of the track format information to determine if the track format error exists with respect to the reconstructed data.

14. The system of claim 13 wherein the means for reconstructing the data is a reconstruct read recovery.

15. The system of claim 9 further comprising the following if the track format error is not detected in the restaged data:
means for passing the restaged data to the host; and
means for indicating to the host that an error which is not the track format error may have occurred.

16. The system of claim 13 further comprising means for rebuilding the track format information to match the reconstructed data.

17. The system of claim 14 further comprising:
means for checking the data for errors not associated with the track format information; and
means for correcting the errors not associated with the track format information.

18. The system of claim 15 further comprising the following if the track format error is not detected with respect to the reconstructed data:
means for identifying a disk having the track associated with the track format error; and
means for rejecting the disk having the track associated with the track format error from the storage disk array.

19. An article of manufacture for use in programming a data storage system to recover from a track format error, the data storage system having a host, a storage disk array having tracks storing data and a storage controller, the storage controller staging data from the disk array and de-staging data to the disk array, the storage controller further passing staged data to the host and receiving data from the host, the host validating track format information associated with a data track passed to the host and thereby detecting a track format error, the article of manufacture comprising a storage medium having logic embedded therein to cause components of the data storage system to:
save a copy of the track format information associated with the data track that triggered the track format error;
invalidate the track format information associated with the data track that triggered the track format error;
restage the data; and
compare the restaged data to the saved copy of the track format information to determine if the track format error exists with respect to the restaged data.

20. The article of manufacture of claim 19 wherein the logic further causes the checking of the data for errors not associated with the track format information.

21. The article of manufacture of claim 19 wherein the logic further causes components of the data storage system to take the following steps if the track format error is detected with respect to the restaged data:
reconstruct the data; and
compare the reconstructed data to the saved copy of the track format information to determine if the track format error exists with respect to the reconstructed data.

22. The article of manufacture of claim 21 wherein the data is reconstructed by performing a reconstruct read recovery.

23. The article of manufacture of claim 19 wherein the logic further causes components of the data storage system to take the following steps if the track format error is not detected with respect to the restaged data:
pass the restaged data to the host; and
indicate to the host that an error which is not the track format error may have occurred.

24. The article of manufacture of claim 21 wherein the logic further causes components of the data storage system to:
rebuild the track format information to match the reconstructed data;
write the reconstructed data to the storage disk array; and
pass the reconstructed data to the host.

25. The article of manufacture of claim 21 wherein the logic further causes components of the data storage system to:
check the data for errors not associated with the track format information; and
correct the errors not associated with the track format information.

26. The article of manufacture of claim 24 wherein the logic further causes components of the data storage system to take the following steps if the track format error is not detected in the reconstructed data:
identify a disk having the track associated with the track format error; and
reject the disk having the track associated with the track format error from the storage disk array.

* * * * *